W. MORRIS.
Animal-Traps.

No. 154,889. Patented Sept. 8, 1874.

Witnesses:
Chas. Wahlers.
Henry Gentner.

Inventor.
Wm Morris
Van Santvoord & Hauff
his attys

UNITED STATES PATENT OFFICE.

WILLIAM MORRIS, OF ROCHESTER, NEW YORK.

IMPROVEMENT IN ANIMAL-TRAPS.

Specification forming part of Letters Patent No. 154,889, dated September 8, 1874; application filed June 24, 1874.

*To all whom it may concern:*

Figure 1:
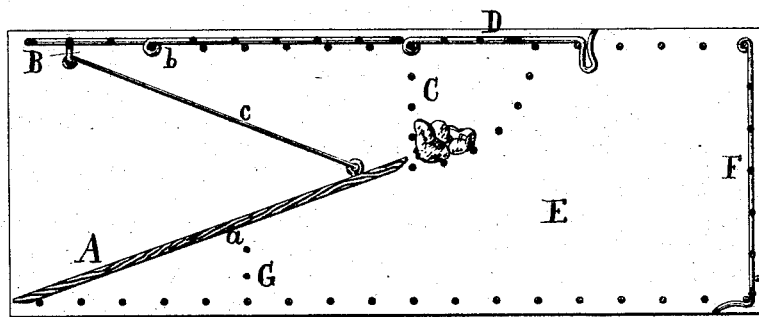
Figure 2:
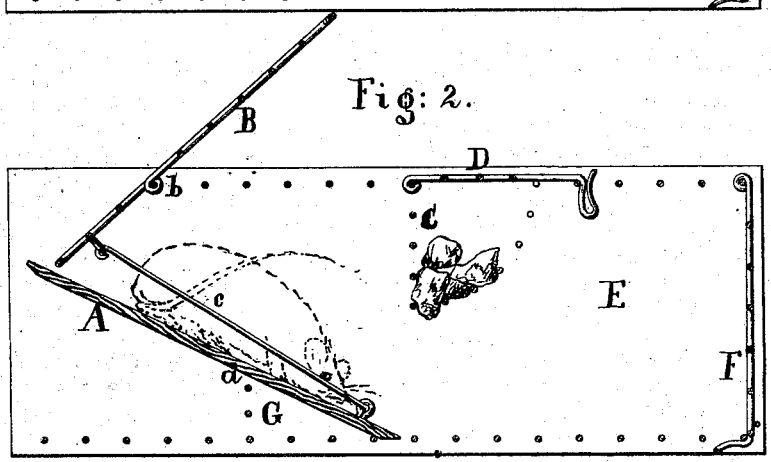

Be it known that I, WILLIAM MORRIS, of Rochester, in the county of Monroe and State of New York, have invented a new and Improved Animal-Trap, of which the following is a specification:

This invention is illustrated in the accompanying drawing, in which Figure 1 represents a longitudinal section, showing the trap in its normal condition. Fig. 2 is a similar section, showing the position thereof immediately on trapping the animal.

Similar letters indicate corresponding parts.

This invention relates to a trap for catching mice, rats, and other animals, which is self-acting, so as to require little or no attention, and which is exceedingly cheap and simple in construction.

My invention consists in a tilting platform combined with a tilting roof, and with a receptacle for bait, in such a manner that, when the mouse or other animal approaches the bait, the platform and roof are tilted in one direction, and the trap is closed, and that, when the animal is in the trap, the said platform and roof are tilted in another, and the trap is again effectually closed. With the tilting platform and bait-receptacle are combined guard-wires, to aid in cutting off the retreat of the animal.

In the drawing, the letter A designates the tilting platform, B is the tilting roof, and C the bait-receptacle, of my trap. The platform A is, in this example, made of wood, and the roof B of wire, and the said roof, in its normal condition, forms a continuation of the top or roof of the trap, as shown in Fig. 1. The bait-receptacle is made in the form of a trough or rack, to which access is had through a hinged door, D. This, however, is capable of various modifications, and can be made even in the form of an ordinary bait-hook, if desired.

The body E of the trap I prefer to construct of wooden sides and wire top and bottom, and in one end of such body is a hinged door, F, to let out the animal.

The tilting platform A has its fulcrum in a wire, $a$, which is the top of a series of guard-wires, hereinafter described, and the tilting roof B has its fulcrum in a wire, $b$, which forms a part of the frame of the trap, both said platform and roof being mounted eccentrically, so that when let loose one end thereof falls, and the platform is inclined. This purpose can also be effected by attaching a small load on one end of the platform. The heaviest portion of the platform, however, with or without the load, is in every case the outer end thereof, or that nearest the entrance to the trap, so that in its normal condition the platform is inclined in that direction.

The platform and roof are connected with each other by a diagonal band, $c$, extending from the inner end of the platform to the outer end of the roof.

The bait, it will be observed, is situated at the upper or highest end of the platform when the trap is set, and, apparently, that forms the only means of access to the bait. The animal will therefore run up the platform, and as soon as it gets beyond the point $a$ its weight causes the platform to tilt inward, and the mouse is precipitated into the trap.

When the platform is thus tilted, the roof B describes a like motion, being drawn in by the band $c$, when the roof is brought against the platform, and acts as a barrier to the escape or retreat of the animal if it should happen to remain on the platform.

When the mouse has left the platform, the latter, being freed, immediately assumes a normal condition, or is inclined outward, whereby the trap is reset, and the mouse is trapped, its retreat being cut off by the said platform, the trough, or bait-receptacle, and by means of guard-wires G, which are arranged below the platform, and constitute a partition at that point, as shown.

What I claim as new, and desire to secure by Letters Patent, is—

1. In an animal-trap, the tilting platform A, tilting roof B, and band $c$, in combination with the bait-receptacle C, constructed and arranged substantially as described.

2. The combination of the tilting platform A and roof B with the bait-receptacle C and guard-wires G, constructed and arranged to operate substantially as described.

In testimony that I claim the foregoing I have hereunto set my hand and seal.

WILLIAM MORRIS. [L. S.]

Witnesses:
WILLIAM MADDICKS,
JOHN WALLACE.